United States Patent
Fiesel

(10) Patent No.: US 11,913,543 B2
(45) Date of Patent: Feb. 27, 2024

(54) METHOD AND TRANSMISSION CONTROL APPARATUS FOR OPERATING A MULTIPLE-SPEED VEHICLE TRANSMISSION

(71) Applicant: ZF Friedrichshafen AG, Friedrichshafen (DE)

(72) Inventor: Sascha Fiesel, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/930,520

(22) Filed: Sep. 8, 2022

(65) Prior Publication Data
US 2023/0184330 A1  Jun. 15, 2023

(30) Foreign Application Priority Data
Dec. 15, 2021  (DE) .................. 10 2021 214 377.6

(51) Int. Cl.
*F16H 61/20* (2006.01)
*F16H 59/50* (2006.01)
(Continued)

(52) U.S. Cl.
CPC ............. *F16H 61/20* (2013.01); *F16H 59/50* (2013.01); *F16H 59/72* (2013.01); *F16H 61/16* (2013.01);
(Continued)

(58) Field of Classification Search
CPC .......... F16H 61/20; F16H 59/72; F16H 61/16; F16H 61/28; F16H 2059/6823;
(Continued)

(56) References Cited

U.S. PATENT DOCUMENTS 10,836,397 B1 * 11/2020 Christensen ........ F16H 61/0213
2006/0172855 A1 * 8/2006 Pollak ................... F16D 48/062
477/70
(Continued)

FOREIGN PATENT DOCUMENTS

| DE | 10 2009 002 108 A1 | 10/2010 |
| DE | 10 2017 221 401 A1 | 5/2019 |
| DE | 10 2020 115 131 A1 | 12/2021 |

OTHER PUBLICATIONS

German Patent Office, Office Action issued in German patent application No. 10 2021 214 376.8 (dated Jul. 8, 2022).
(Continued)

*Primary Examiner* — Roger L Pang
(74) *Attorney, Agent, or Firm* — Finch & Maloney PLLC

(57) ABSTRACT

Disclosed is method for operating a multi-gear vehicle transmission having a plurality of shifting elements (A, B, C, D, E) for engaging gears of the vehicle transmission. In a neutral gear a transmission input (1) and a transmission output (2) of the vehicle transmission are decoupled from one another. In a driving gear the transmission input (1) and the transmission output (2) of the vehicle transmission are coupled with one another by closing the shifting elements (A, B, C, D, E) associated with the driving gear in order to propel the vehicle. When the neutral gear is engaged, a transmission condition is determined, and if a transmission condition with elevated drag losses exists, then in addition to the shifting elements (A, B, C, D, E) of a driving gear, at least one further shifting element (A, B, C, D, E) of the vehicle transmission is closed.

12 Claims, 2 Drawing Sheets

(51) Int. Cl.
  *F16H 59/72* (2006.01)
  *F16H 61/16* (2006.01)
  *F16H 61/28* (2006.01)
  *F16H 59/68* (2006.01)
  *F16H 61/12* (2010.01)
(52) U.S. Cl.
  CPC .  *F16H 61/2807* (2013.01); *F16H 2059/6823* (2013.01); *F16H 2061/1232* (2013.01); *F16H 2200/006* (2013.01); *F16H 2200/0052* (2013.01); *F16H 2200/201* (2013.01); *F16H 2200/2012* (2013.01); *F16H 2200/2043* (2013.01); *F16H 2312/022* (2013.01)
(58) Field of Classification Search
  CPC ....... F16H 2200/0052; F16H 2200/006; F16H 2200/201; F16H 2200/2012; F16H 2200/2043; F16H 2312/022; F16H 2061/207; F16H 2306/18; B60W 30/192; B60W 30/194

USPC .............................................. 701/51, 60, 65
See application file for complete search history.

(56) References Cited

U.S. PATENT DOCUMENTS

| | | | |
|---|---|---|---|
| 2018/0335133 A1* | 11/2018 | Webert | F16H 3/66 |
| 2019/0368601 A1* | 12/2019 | Jacobs | F16H 61/0059 |
| 2022/0221051 A1* | 7/2022 | Blaser | F16H 61/06 |
| 2023/0023472 A1* | 1/2023 | Ley | F16H 61/30 |

OTHER PUBLICATIONS

German Patent Office, Office Action issued in German patent application No. 10 2021 214 373.3 (dated Jul. 11, 2022).
German Patent Office, Office Action issued in German patent application No. 10 2021 214 377.6 (dated Jul. 8, 2022).

* cited by examiner

| Gear | Brake | | Clutch | | |
|---|---|---|---|---|---|
| | A | B | C | D | E |
| 1 | • | • | • | | |
| 2 | • | • | | | • |
| 3 | | • | • | | • |
| 4 | | • | | • | • |
| 5 | | • | • | • | |
| 6 | | | • | • | • |
| 7 | • | | • | • | |
| 8 | • | | | • | • |
| R | • | • | | • | |

METHOD AND TRANSMISSION CONTROL APPARATUS FOR OPERATING A MULTIPLE-SPEED VEHICLE TRANSMISSION

RELATED APPLICATIONS

This application claims the benefit of and right of priority under 35 U.S.C. § 119 to German Patent Application no. 10 2021 214 377.6, filed on 15 Dec. 2021, the contents of which are incorporated herein by reference in its entirety

FIELD OF THE DISCLOSURE

The invention relates to a method for operating a multi-gear vehicle transmission. In addition, the invention relates to a transmission control unit designed to carry out the method, and to a corresponding computer program for carrying out the method in the transmission control unit. Furthermore, the invention relates to a vehicle transmission and a motor vehicle with a vehicle transmission.

BACKGROUND

Multi-gear transmissions are known in automotive technology and are widely used. The gears, also called steps or gear ratios, produce various transmission ratios of the transmission between a transmission input and a transmission output. The gears can be selectively engaged. In that way, a torque delivered by a drive motor of the vehicle can be converted as a function of the situation. For example, in a starting gear a high gear ratio can be selected in order to accelerate the vehicle. In another, driving gear a lower gear ratio can be selected in order to maintain the speed of the vehicle with lower fuel consumption. The individual gears are engaged by means of shifting elements of the transmission.

In a neutral gear of the vehicle transmission, also called the idling gear, the transmission input and the transmission output are decoupled from one another. To engage the neutral gear a sufficiently large number of shifting elements of the transmission are opened. In the neutral gear the vehicle can be pushed or towed. Likewise, in the neutral gear internal drag losses of the transmission can be minimized. The engagement of the neutral gear can therefore be advantageous, for example during brief stopping phases of the vehicle in which the drive motor of the vehicle is still running. The engagement of the neutral gear can be called for by a driver of the vehicle or by an automatic system.

When the neutral gear is engaged, in practice it is desirable to change gear into one of the driving gears of the transmission as quickly and comfortably as possible, particularly into the starting gear used for starting off. To prepare for this gearshift the so-termed air-gap of at least one of the shifting elements for the starting gear can be selectively reduced.

In the case of a pressure-medium-actuated shifting element this preparation takes place in that in the neutral gear, the actuating piston of the shifting element is pre-filled with pressure medium. During this a certain amount of pressure medium is already delivered to the actuating piston. The said amount is calculated such that the shifting element is not yet closed. The closing process can then be initiated by feeding in more pressure medium and/or increasing the pressure in the actuating piston. In particular, during the pre-filling the shifting element is brought (almost) to its so-termed touch-point.

The amount of pressure medium required for the pre-filling depends on many factors. These are in particular the component tolerances and the current wear condition of the shifting element concerned, and the current friction situation in the transmission. Sufficiently accurate sensors for an exact determination of the pre-filling required and the already existing pre-filling are normally not provided in vehicle transmissions. Too much pre-filling can bring about an undesired (partial) closing of the shifting element. This can result in undesired rolling of the vehicle in the neutral gear. Too little pre-filling can give rise to delayed and/or uncomfortable closing of the shifting element when shifting out of the neutral gear into a driving gear.

A method for controlling a multi-gear vehicle transmission is known from DE 10 2017 221 401 A1.

SUMMARY

The purpose of the present invention is to provide a new type of method for operating a multi-gear vehicle transmission. In addition, a transmission control unit designed to carry out the method, a computer program for implementing the method in the transmission control unit, a vehicle transmission, and a motor vehicle with a vehicle transmission are indicated.

Form the process-technological standpoint this objective is achieved by various features disclosed herein. A transmission control unit designed to carry out the method is also disclosed. Finally, a computer program for implementing the method on such a transmission control unit and a vehicle transmission with such a transmission control unit and a motor vehicle with such a vehicle transmission are additional aspects of the present disclosure. Advantageous further developments will be apparent in light of the following description and the drawings.

According to the present invention, a method for operating a multi-gear vehicle transmission is proposed. The vehicle transmission has a plurality of shifting elements for engaging the gears of the vehicle transmission. The vehicle transmission has at least one neutral gear and at least one gear designed for forward driving and a gear designed for reverse driving. In the neutral gear the transmission input and the transmission output are decoupled from one another. The neutral gear corresponds to idling of the transmission. On the other hand, in a driving gear the transmission input is coupled to the transmission output in order propel the vehicle. This coupling can be brought about by closing the shifting elements associated with the driving gear. Thus, the gearshift from the neutral gear to the driving gear is carried out by closing the shifting elements of the vehicle transmission associated with the driving gear.

The shifting elements of the vehicle transmission can be termed transmission shifting elements and are in the form of clutches and/or brakes. The shifting elements can be designed to be actuated by a pressure medium, for example hydraulically or pneumatically. In particular, as the pressure medium the lubricant of the vehicle transmission is used. Preferably the shifting elements are in the form of frictional shifting elements, such as a disk clutch or a disk brake. The vehicle transmission is in particular an automatic transmission of planetary design. The actuation of the shifting elements is preferably controlled by a transmission control unit. Thus, the transmission control unit brings about the situation-related actuation of the shifting elements. The vehicle transmission is designed to be used in a motor vehicle, for example in a passenger car, a truck, or a powered omnibus. However, the vehicle transmission can also be designed for use in a rail vehicle, in an agricultural vehicle, or in other vehicles.

A driving gear is understood to be those gears of the vehicle transmission which are provided for propelling the vehicle, i.e. forward gears and reversing gears. When a driving gear is engaged the transmission input and the transmission output of the vehicle transmission are coupled to one another by the closed shifting elements of the driving gear. On the other hand, in the neutral gear it is provided that the transmission input and the transmission output are decoupled from one another. Thus, in the neutral gear the vehicle cannot be propelled by means of the vehicle transmission.

The driving gear is preferably a starting gear for starting the vehicle. In particular, in such a starting gear the gear ratio is high compared with other gears of the vehicle transmission. Thus, other gears of the vehicle transmission have lower gear ratios. Such a starting gear is in particular the first gear. The starting gear can vary, depending on the situation at hand. For example, if it is detected that a vehicle is lightly loaded, a second gear can be selected. It is also possible that, depending on the situation, a reversing gear can be selected as the starting gear. Then, in the neutral gear the shifting elements associated with the starting gear selected are pre-filled or prestressed in order to prepare for the gearshift into the starting gear.

In the pre-filled or prestressed condition no force or torque can be transmitted by the shifting element. In a partially closed or fully closed condition a force or torque can be transmitted by the shifting element.

In the context of the method according to the invention it is provided that with the neutral gear engaged, at least one transmission condition of the vehicle transmission is determined. If the determination of the transmission condition reveals that with the neutral gear engaged a transmission condition with elevated drag losses exists, then it is provided that in addition to the shifting elements of a driving gear at least one further shifting element of the vehicle transmission is closed.

Thus, the shifting element which is closed in addition to the shifting elements associated with a driving gear is therefore associated with some other gear of the vehicle transmission. By additionally closing the at least one further shifting element, the vehicle transmission is braced or blocked. In that way, an undesired rolling condition of the vehicle brought about by elevated drag losses in the vehicle transmission can advantageously be prevented.

In this case the shifting element which is closed in addition to the shifting elements associated with the driving gear can be closed fully or partially. In the partially closed condition the shifting element can already transmit some force or torque, which can prevent an undesired rolling of the vehicle by bracing the vehicle transmission. However, in the partially closed condition the force or torque that can be transmitted by the shifting element is less than in the fully closed condition, in which the vehicle transmission is blocked.

Preferably, the operation of the vehicle transmission is monitored continually or at regular intervals. In this, it is in particular determined whether the neutral gear is engaged and whether the condition of elevated drag losses exists. For that purpose, in particular, sensor information from sensors of the vehicle and of the vehicle transmission are evaluated, which information is indicative of such conditions. In particular, it is checked whether the neutral gear is actually engaged. This can be done in any way. For example, it can be done with reference to actuation signals for valves of the vehicle transmission used for actuating the shifting elements.

Alternatively, or in addition, it can be done with reference to pressure signals from one or more pressure sensors of the vehicle transmission for the pressure medium. Other determination methods not explicitly mentioned here can also be used. This determination also takes place in particular for other purposes, especially for the correct control of the transmission by the transmission control unit, and/or for displaying the gear currently engaged on a monitor screen inside the vehicle.

The transmission condition with elevated drag losses is produced in particular when the vehicle transmission has not yet reached a high enough temperature. When the transmission is cool the lubricant present in it (usually transmission oil) has relatively high viscosity. The component friction and splashing losses in the transmission are correspondingly high. A shifting element correctly pre-filled or prestressed under normal operating conditions can in these circumstances still transmit some undesired torque. This transmission condition is therefore equivalent to a "cold" vehicle transmission. The said transmission condition can exist, for example, if the transmission lubricant is below a certain temperature, such as 50° C.

Whether or not the transmission is in a condition with elevated drag losses, can be determined in any desired way. This takes place in particular with reference to a transmission temperature, especially a temperature of the transmission lubricant (oil temperature). For that purpose, a temperature sensor is preferably provided in the vehicle transmission. Alternatively, or in addition, the determination can be done with reference to a temperature model of the vehicle transmission. Alternatively, or in addition, this can be done with reference to a time that has passed since the starting of a motor of a drive motor of the vehicle that is or can be coupled to the vehicle transmission. Further determination methods not explicitly mentioned here can also be used. Preferably, the determined transmission temperature or the time passed is compared with a threshold value. If the transmission temperature or the time passed is below the threshold value, it is assumed from this that the transmission is in a condition with elevated drag losses. If the transmission temperature or the time passed is above the threshold value, it is assumed from this that an operating temperature of the vehicle transmission has been reached or exceeded, and the transmission condition of elevated drag losses does not exist, or no longer so. The transmission is then running hot, whereby the drag losses in the transmission are reduced sufficiently. Then, it is advantageously provided that in the vehicle transmission the neutral gear is engaged. The temperature threshold value is preferably between 40° C. and 60° C. A particularly suitable threshold value for the temperature is between 45° C. and 55° C., in particular 50° C.

By virtue of the bracing or blocking of the vehicle transmission, in that at least one shifting element of the vehicle transmission in addition to the shifting elements of a driving gear is closed, the energy supplied by the drive motor of the vehicle to the vehicle transmission, in particular to a torque converter of the vehicle transmission, is converted to heat. In that way the vehicle transmission can reach its operating temperature more quickly.

The vehicle transmission can be designed in such manner that some of the shifting elements of a forward gear, in particular a starting gear, are also closed to obtain the reversing gear. If the transmission is in a condition with elevated drag losses, then preferably the shifting elements of the starting gear and the shifting elements of the reversing gear are closed. Advantageously, the shifting elements closed in the starting gear differ from the shifting elements closed in the reversing gear by just one shifting element. If starting from there the starting gear is called for by a driver, then in order to engage the starting gear has to be opened only for that shifting element which is not a shifting element of the forward gear. Since the shifting elements of the starting gear are already closed, the starting gear is already engaged, and the vehicle can move forward immediately. On the other hand, if the reversing gear is called for by the driver, then to engage the reversing gear, only that shifting element of the forward gear which is not a shifting element of the reversing gear has to be opened and the vehicle can then drive in reverse immediately. In that way, the vehicle transmission can be shifted from the braced or blocked condition to the driving gear particularly quickly and comfortably.

The vehicle transmission can preferably be designed such that in a driving gear at least two shifting elements of the vehicle transmission are closed. The vehicle transmission can be designed such that in a driving gear, exactly three shifting elements of the vehicle transmission are closed.

The method proposed is controlled by the also proposed transmission control unit. This means that the method is carried out by way of the transmission control unit. Accordingly, the proposed transmission control unit is specially designed to carry out the method with the respective steps indicated. For this, the transmission control unit has in particular an input and an output, and computation means. Moreover, the transmission control unit also comprises a storage medium (data memory) in which the special commands required for carrying out the method are stored. The input of the transmission control unit is designed such that the necessary information can be fed into the transmission control unit via the input, for example the transmission temperature at the time. The output of the transmission control unit is designed such that the control signals for actuating the shifting elements can be emitted via the output, for example signals for opening and closing valves of the shifting elements. The computation means carry out the commands stored in the storage medium, and for that purpose the incoming information is processed and the corresponding control signals for the shifting elements are emitted. The computation means consist in particular of a microprocessor.

A computer program according to the invention is designed to enable a transmission control unit to carry out the method according to the invention or a preferred further development thereof, when the computer program is implemented in the transmission control unit. In this connection a computer-readable medium is included in the object of the invention, on which a computer program as described above can be stored and from which it can be called up.

BRIEF DESCRIPTION OF THE DRAWINGS

Below, the invention is explained in greater detail with reference to figures, from which preferred embodiments and features of the invention emerge, and which show.

DETAILED DESCRIPTION

Figures 1, 2:
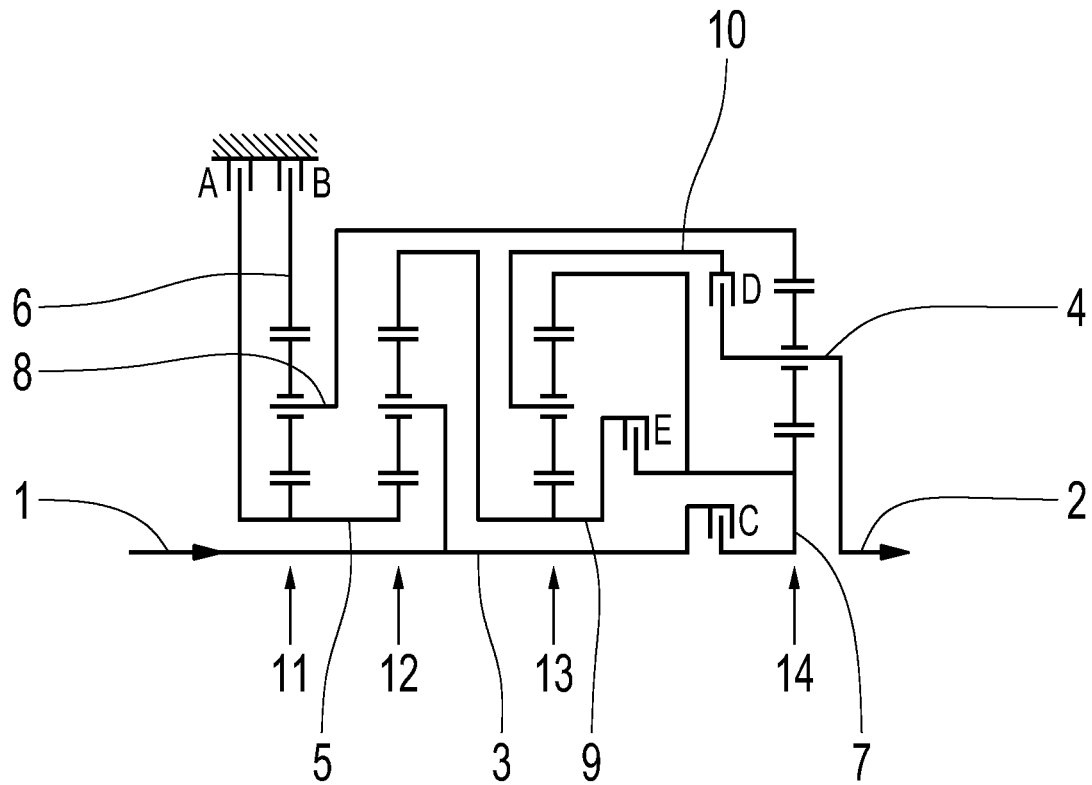
FIG. 1: A schematic representation of an automatic transmission of planetary design.
FIG. 2: An example of a shifting scheme for the automatic transmission in FIG. 1.

FIG. 1 shows a diagram of an example of an automatic transmission of a motor vehicle, wherein a drive aggregate (not shown) is coupled to a transmission input 1 of the automatic transmission and a drive output of the motor vehicle (not shown) is coupled to a transmission output 2 of the automatic transmission.

The automatic transmission shown in FIG. 1 is of planetary design and comprises a total of eight shafts 3, 4, 5, 6, 7, 8, 9, and 10, the shaft 3 being a transmission input shaft and the shaft 4 being a transmission output shaft. The shafts 3 to 10 of the automatic transmission of FIG. 1 are in driving connection on the one hand by way of gearsets 11, 12, 13, and 14, and on the other hand by way of transmission-internal shifting elements A, B, C, D, and E.

The automatic transmission shown in FIG. 1 has four gearsets 11, 12, 13, and 14 and five shifting elements A, B, C, D, and E, the shifting elements A and B being in the form of brakes and the shifting elements C. D. and E being in the form of clutches. With the automatic transmission shown in FIG. 1 a total of eight forward gears and one reversing gear can be engaged, and in each of the said gears three shifting elements are closed and two shifting elements are open. To carry out a gearshift, and thus to carry out a shifting process, at least one of the previously open shifting elements A, B, C, D, and E of the automatic transmission is closed or engaged and at least one of the previously closed shifting elements A, B, C, D, and E is opened or disengaged. The transmission layout shown in FIG. 1 is presented purely as an example. For example, in addition to frictional shifting elements interlocking shifting elements can also be present.

FIG. 2 shows an example of a shifting scheme for the automatic transmission in FIG. 1. In each gear three of the shifting elements A, B, C, D. and E are closed and two of the shifting elements A, B, C, D, and E are open. The shifting elements are in the form of brakes A, B and clutches C, D, E.

The first forward gear is obtained by closing the brakes A and B and the clutch C, the second forward gear by closing the brakes A and B and the clutch E, the third forward gear by closing the brake B and the clutches C and E, the fourth forward gear by closing the brake B and the clutches D and E, the fifth forward gear by closing the brake B and the clutches C and D, the sixth forward gear by closing the clutches C, D, and E, the seventh forward gear by closing the brake A and the clutches C and D, and the eighth forward gear by closing the brake A and the clutches D and E. The reversing gear is obtained by closing the brakes A and B and the clutch D.

According to the invention, an undesired rolling condition of the vehicle caused by elevated drag losses of the vehicle transmission can be prevented. During a possible actuation of the multi-gear vehicle transmission, for example, the following steps can be carried out:

1. The neutral gear of the vehicle transmission is called for, for example automatically, or by a driver who has switched the driving switch to the "neutral" driving switch position.

2. When the neutral gear is called for, first of all a transmission condition of the vehicle transmission is determined. If a transmission condition with elevated drag losses exists, then in addition to the shifting elements A, B, C of a driving gear, so that in this case the driving gear considered is the first forward gear, at least one of the further shifting elements D. E of the vehicle transmission is actuated in the closing direction. By closing at least one of the two clutches D, E the vehicle transmission is braced or blocked and in that way the motor vehicle is kept at a standstill. Preferably however, only the clutch D of the vehicle transmission is additionally closed in order to achieve the bracing or blocking of the transmission. Thus, four shifting elements A, B, C, D of the vehicle transmission are actuated, of which the shifting elements A, B, C are shifting elements of the first gear and the shifting elements A, B, D are shifting elements of the reversing gear. The brakes A. B are thus closed both for the first gear and for the reversing gear.

3. If then the driver calls for the first gear as a starting gear, the shifting element D of the reversing gear is opened. Since the shifting elements A, B, C of the first gear are already closed, the first gear is engaged by opening the clutch D and the vehicle can move off immediately.

4. If instead of the first gear the driver calls for the reversing gear, then the shifting element C of the first gear is opened. Since the shifting elements A, B, D of the reversing gear are already closed, opening the clutch C engages the reversing gear and the vehicle can move in reverse immediately.

5. If the operating temperature of the vehicle transmission has been reached before the driver calls for a driving gear, then in the vehicle transmission the neutral gear is engaged. For this the two clutches C, D are opened and the brake B is pre-filled, while the brake A remains closed. If the vehicle transmission has reached its operating temperature, the drag losses of the vehicle transmission while the neutral gear are so low that the vehicle does not change to an undesired rolling condition.

Figures 3, 4:
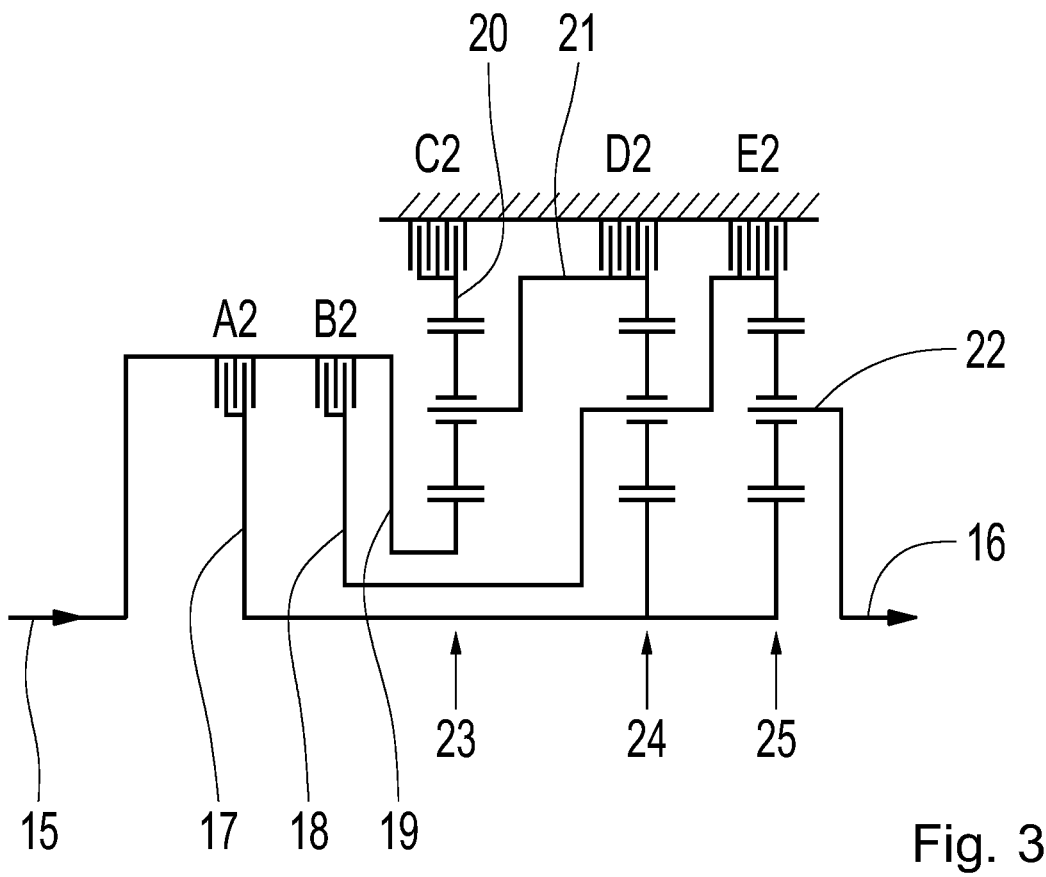
FIG. 3: A schematic representation of a further automatic transmission of planetary design.
FIG. 4: An example of a shifting scheme for the automatic transmission in FIG. 3.

FIG. 3 shows a second example transmission layout of an automatic transmission for a motor vehicle, wherein a drive aggregate (not shown) can be coupled to a transmission input 15 of the automatic transmission and a transmission output 16 of the automatic transmission can be coupled to a drive output (not shown) of the motor vehicle.

The automatic transmission shown in FIG. 3 is of planetary design and comprises a total of six shafts 17, 18, 19, 20, 21, and 22, the shaft 19 being a transmission input shaft and the shaft 22 being a transmission output shaft. The shafts 17 to 22 of the automatic transmission in FIG. 3 are in driving connection on the one hand by way of gearsets 23, 24, and 25 and on the other hand by way of transmission-internal shifting elements A2, B2, C2, D2, and E2.

The automatic transmission shown in FIG. 3 has three gearsets 23, 24 and 25 and five shifting elements A2, B2, C2, D2, and E2, wherein the shifting elements A2 and B2 are in the form of clutches and the shifting elements C2, D2, and E2 are brakes. With the automatic transmission shown in FIG. 3 a total of six forward gears and one reversing gear can be engaged, and in each of these gears two shifting elements are closed and three shifting elements are open. To carry out a gearshift and thus to carry out a shifting process, at least one of the previously open shifting elements A2, B2, C2, D2, and E2 of the automatic transmission is closed or engaged and at least one of the previously closed shifting elements A2, B2, C2, D2, and E2 is opened or disengaged. The transmission layout shown in FIG. 3 is presented purely as an example. Besides frictional shifting elements, interlocking shifting elements can also be present.

FIG. 4 shows an example shifting scheme for the automatic transmission of FIG. 3. In each gear two of the shifting elements A2. B2, C2, D2, and E2 are closed and three of the shifting elements A2, B2, C2, D2, and E2 are open. The shifting elements are in the form of clutches A2, B2 and brakes C2. D2, and E2.

The first forward gear is obtained by closing the clutch A2 and the brake E2, the second forward gear by closing the clutch A2 and the brake D2, the third forward gear by closing the clutch A2 and the brake C2, the fourth forward gear by closing the clutches A2 and B2, the fifth forward gear by closing the clutch B2 and the brake C2, and the sixth forward gear by closing the clutch B2 and the brake D2. The reversing gear is obtained by closing the brakes C2 and E2.

According to the invention, with this embodiment too an undesired rolling condition of the vehicle caused by elevated drag losses in the vehicle transmission can be prevented. During a possible actuation of the multi-gear vehicle transmission, for example the following steps can be carried out:

1. The neutral gear of the vehicle transmission is called for, for example automatically, or by a driver who actuates the driving switch to the "Neutral" driving switch position.

2. When the neutral gear is called for, first of all a transmission condition of the vehicle transmission is determined. If the transmission is in a condition with elevated drag losses, then in addition to the shifting elements A2, E2 of a driving gear, and here again the first forward gear is considered as the said driving gear, at least one of the further shifting elements B2, C2, D2 of the vehicle transmission is actuated in the closing direction. By closing at least the clutch B2 or one of the two brakes C2, D2, the vehicle transmission is braced or blocked and in that way the motor vehicle is kept at a standstill. Preferably however, only the brake C2 of the vehicle transmission is additionally closed in order to bring about the bracing or blocking of the transmission. Then, three shifting elements A2, C2, E2 of the vehicle transmission are actuated, of which the shifting elements A2. E2 are shifting elements of the first gear and the shifting elements C2. E2 are shifting elements of the reversing gear. Thus, the brake E2 is closed both for the first gear and also for the reversing gear.

3. If thereafter the driver calls for the first gear as a starting gear, the shifting element C2 of the reversing gear is opened. Since the shifting elements A2, E2 of the first gear are already closed, by opening the brake C2 the first gear is engaged and the vehicle can drive forward immediately.

4. If instead of the first gear the driver calls for the reversing gear, then the shifting element A2 of the first gear is opened. Since the shifting elements C2. E2 of the reversing gear are already closed, the reversing gear is engaged by opening the clutch A2 and the vehicle can move off in reverse immediately.

5. If the operating temperature of the vehicle transmission has been reached before the driver calls for a driving gear, then the neutral gear is engaged in the vehicle transmission. If the vehicle transmission has reached its operating temperature, the drag losses of the vehicle transmission while the neutral gear is engaged are so low that the vehicle does not change to an undesired rolling condition.

By virtue of the method proposed an undesired rolling condition of the vehicle if the vehicle transmission is cold. i.e. with a transmission condition in which drag losses are elevated, can be reliably avoided.

INDEXES

1 Transmission input
2 Transmission output
3 Shaft
4 Shaft
5 Shaft
6 Shaft
7 Shaft 8 Shaft
9 Shaft
10 Shaft
11 Gearset
12 Gearset
13 Gearset
14 Gearset
15 Transmission input
16 Transmission output
17 Shaft
18 Shaft
19 Shaft
20 Shaft
21 Shaft
22 Shaft
23 Gearset
24 Gearset
25 Gearset
A Shifting element/Brake
B Shifting element/Brake
C Shifting element/Clutch
D Shifting element/Clutch
E Shifting element/Clutch
A2 Shifting element/Clutch
B2 Shifting element/Clutch
C2 Shifting element/Brake
D2 Shifting element/Brake
E2 Shifting element/Brake

The invention claimed is:

1. A method for operating a multi-gear vehicle transmission having shifting elements configured for engaging gears of the vehicle transmission, the method comprising:
decoupling a transmission drive input from a transmission drive output of the vehicle transmission when the vehicle transmission is in a neutral gear;
coupling the transmission drive input and the transmission drive output of the vehicle transmission when in a driving gear by closing shifting elements associated with the driving gear in order to propel the vehicle;
determining that a transmission condition with elevated drag losses exists when the neutral gear is engaged;
closing shifting elements of a forward gear to engage the forward gear; and
closing shifting elements of a reversing gear to engage the reverse gear, wherein the shifting elements of the forward gear differ from the shifting elements of the reversing gear by only one shifting element.

2. The method according to claim 1, wherein determining that the transmission condition with elevated drag losses exists takes into account at least one of (i) a transmission temperature, (ii) an operating duration of the vehicle transmission since starting a motor of a drive motor that is or can be coupled to the vehicle transmission, and (iii) a temperature model of the vehicle transmission.

3. The method according to claim 2, wherein determining that the transmission condition with elevated drag losses exists takes into account at least the transmission temperature, determined by taking into account a lubricant temperature of the vehicle transmission.

4. The method according to claim 2, wherein determining that the transmission condition with elevated drag losses exists takes into account at least the transmission temperature and wherein determining the transmission temperature is performed using a temperature sensor.

5. The method according to claim 1, comprising:
opening the shifting element of the reversing gear, which is not one of the shifting elements of the forward gear, when the forward gear is called for, wherein the forward gear is already engaged by virtue of the shifting elements of the vehicle transmission still being closed.

6. The method according to claim 1, comprising:
opening the shifting element of the forward gear which is not one of the shifting elements of the reversing gear when the reversing gear is called for, whereupon the reversing gear is already engaged by virtue of the shifting elements of the vehicle transmission still being closed.

7. A transmission control unit configured to carry out a method according to claim 1.

8. The transmission control unit of claim 7 comprising computer-readable code that when executed by the transmission control unit, causes the control unit to carry out the method according to claim 1.

9. A vehicle transmission comprising the transmission control unit according to claim 8.

10. A motor vehicle comprising the vehicle transmission according to claim 9.

11. A method for operating a multi-gear vehicle transmission having shifting elements configured for engaging gears of the vehicle transmission, the method comprising:
decoupling a transmission drive input from a transmission drive output of the vehicle transmission when the vehicle transmission is in a neutral gear:
coupling the transmission drive input and the transmission drive output of the vehicle transmission when in a driving gear by closing shifting elements associated with the driving gear in order to propel the vehicle;
determining that a transmission condition with elevated drag losses exists when the neutral gear is engaged;
closing at least one further shifting element of the vehicle transmission
closing the shifting elements associated with the driving gear:
determining that an operating temperature of the vehicle transmission has been reached or exceeded; and
engaging the neutral gear of the vehicle transmission.

12. The method according to claim 11, comprising determining the operating temperature using a temperature sensor.

* * * * *